Nov. 23, 1965  M. E. ASH  3,219,319
CONCENTRATION CONTROL APPARATUS FOR A CONTINUOUS FLOW SYSTEM
Original Filed July 30, 1962
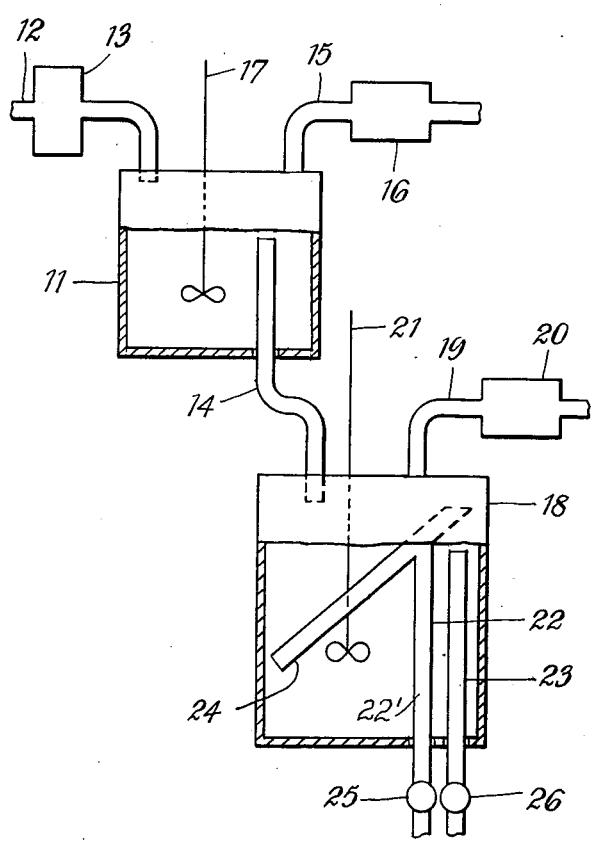

United States Patent Office

3,219,319
Patented Nov. 23, 1965

3,219,319
CONCENTRATION CONTROL APPARATUS FOR
A CONTINUOUS FLOW SYSTEM
Michael Edward Ash, Ealing, London, England, assignor to Arthur Guinness Son and Company (Park Royal) Limited, London, England, a British company
Original application July 30, 1962, Ser. No. 213,313. Divided and this application Aug. 5, 1963, Ser. No. 299,741
4 Claims. (Cl. 259—4)

This application is a division of applicant's co-pending application Serial No. 213,313, filed July 30, 1962.

This invention relates in general to continuous flow systems of the kind in which liquid suspensions comprising a mechanical dispersion of sedimentable particles in a liquid of relatively lower specific gravity, are caused to flow through a processing vessel or series of vessels.

More specifically, the invention is concerned with continuous fermentation systems and provides apparatus for controlling the relative degree of concentration of micro-organisms in substrate as between any two or all of the stages: inflow, vessel and outflow.

In particular, the invention has been developed for use in connection with the continuous fermentation of Brewer's wort in a chemostat system.

The invention is believed to be applicable to any microbiological process in which a sedimental micro-organism is operated in a nutrient liquid, and is in the form of a mechanical dispersion in liquid nutrient of relatively lower specific gravity, so that in the absence of turbulence, the micro-organisms tend to settle at the bottom of the vessel.

It has already been proposed continuously to ferment Brewer's wort or other fermentable substrate in a plurality of sequentially arranged stirred or unstirred vessels, and to separate the fermenting micro-organisms (yeast) from the fermented product (beer) by settlement in a separate vessel or in a part of the final fermentation vessel separated from the stirred region by a baffle.

Considerations of efficiency and consistency of product normally require the maintenance of a predetermined concentration of micro-organisms in the various vessels used in continuous fermentation processes of this kind. For example, in a chemostat system a constant volume of substrate is held in a fermenting vessel and substrate passes continuously through that vessel under equilibrium flow conditions so that a steady reaction is maintained within that vessel. It is frequently desirable for the concentration of micro-organisms in the vessel to be relatively high and considerably higher than the average concentration of micro-organisms flowing through the system. Hitherto such concentration has usually been achieved by separating the micro-organisms from the effluent and recycling some of the separated organisms.

In such fermentation processes a certain amount of autolysis of the organism is liable to take place during the time when it is maintained at high concentration in the effluent in the separating chamber and in associated conduits. If this micro-organism is recycled it will carry with it some of the autolyzed micro-organisms, which latter will tend to build up in the fermentation vessel. Moreover, recycling can involve danger that any infection of the micro-organisms in the effluent before or after separation will result in the infected recycled micro-organisms infecting the micro-organisms in the vessel itself. This danger can be avoided if all micro-organisms passing through the system are separated from the effluent and are never recycled.

It is an object of the present invention to provide a simple and easily operable apparatus for effecting, in a continuous fermentation system of the kind to which this invention relates, controlled variation of the degree of concentration of the micro-organisms in the main body of substrate in the vessel relative to the concentration in the inflow and/or in the outflow, without the necessity for recycling and without upsetting equilibrium flow conditions.

It will be seen that where it is desired to maintain a greater concentration of micro-organisms in the substrate in the vessel itself than the average concentration in the liquid flowing through the system, steps must be taken to provide an initial build-up of micro-organisms in the vessel.

It is another object of the present invention to provide in a continuous chemostatic fermentation system, wherein a series of vessels is employed through which continuous flow of substrate takes place, and wherein the inflow to the second and subsequent vessels in a series is constituted by substrate containing a predetermined concentration of micro-organisms, apparatus for obtaining and maintaining a greater concentration of micro-organisms in any vessel other than the first, than in the liquid suspension entering said vessel, or in said effluent from the vessel. This is achieved by continuously agitating the main body of the substrate in said vessel to maintain a substantially consistent dispersion of micro-organisms throughout said main body, partially isolating a column of substrate within the vessel from the effects of said agitation, the column extending from immediately below the surface of said substrate down to a region somewhat above the base of said vessel, whereby micro-organisms settling within the column are free to emerge and return to the main body of the substrate at the base of the column, and withdrawing substrate and micro-organisms from said column as primary effluent having a relatively low concentration of micro-organisms; together with, as a secondary effluent, substrate containing micro-organisms at average dispersion from the main body of the substrate suspension in the vessel, the relative volumetric flow rate of primary effluent and secondary effluent being variable so that the desired degree of concentration of micro-organisms in the aggregate effluent may be controlled.

It is a further object of the invention to provide means means whereby the increased concentration of micro-organisms in the main body of substrate in said vessel may be kept substantially constant, while the throughflow proceeds with a lower but balanced concentration of micro-organisms.

It has been found that optimum results are obtainable when the isolated region comprises a column inclined to the vertical. This is believed to be because micro-organisms, tending to settle, are allowed to travel downwardly beneath rising liquid and gaseous bubbles (if any), and thus are not carried upwardly again.

The invention is particularly suitable in microbiological chemostat systems, and in the application of the invention to the fermentation of Brewer's wort, the yeasts are carried in a wort substrate.

It will be observed that the invention avoids any requirement for recycling the particles and, in the case of brewing, I have found that the capacity of the equipment for separating micro-organisms from the substrate effluent emerging from the system does not need to be as great as in conventional continuous fermentation systems, since it is required to handle only the surplus micro-organisms in the effluent and not the additional amount which would be required in the case of recycling.

The invention will now be further described by reference to the accompanying diagrammatic drawing which illustrates diagrammatically apparatus for providing a flow system utilising the principles of this invention when applied to the continuous fermentation of Brewer's wort in the second vessel of a multiple vessel system.

Referring to the drawing, fresh wort enters a pre-fermenter vessel 11 through an inflow pipe 12 by way of an aerator 13 and emerges through an outflow pipe 14. A vent 15, together with a filter 16, for preventing entry of infection to vessel 11, and a stirrer 17 are provided. The pre-fermenter vessel contains a suspension of yeast in wort in pre-determined proportions.

The outflow pipe 14 communicates with the top of a fermentation vessel 18. The vessel 18 has a vent 19, a filter 20, a stirrer 21 and primary and secondary effluent pipes 24, 22 and 23. The primary effluent pipe 22 comprises a tubular shielding part 24, open at its ends, which shielding part is set at an angle to the vertical, and which extends above the surface of the wort, and a second part 22', constituting a draw-off conduit, extending downwardly from a point just above the level of the wort and leading out through the bottom of the vessel.

Valves 25 and 26 are provided respectively on the primary and secondary effluent pipes 22 and 23, whereby the relative volumetric flow rates of primary and secondary effluent may be controlled to obtain the desired concentration of yeast in the aggregate effluent.

The operation of the invention is as follows: Aerated wort is fed to the pre-fermenter vessel 11 which has been seeded with yeast. The yeast is kept distributed by the stirrer 17 and under the aerobic conditions present multiplies, the growth rate being controllable by temperature. A proportion of the yeast within the vessel 11 leaves the vessel as a suspension in the wort through the pipe 14. The dwell-time of the wort in the vessel is arranged so that the amount of yeast leaving the vessel is equivalent to that formed by growth, and thus a steady yeast concentration is obtained in the vessel.

The effluent from the vessel 11 passes to the vessel 18 where under substantially anaerobic conditions it ceases to multiply and fermentation takes place. The wort yeast suspension is stirred and can leave the vessel through the primary and secondary effluent pipes 24, 22 and 23. In order for the suspension to reach the mouth of the primary effluent pipe it has to travel up the sloping shielding part 24, which protects the suspension within it from the effects of agitation. Thus the yeast, being sedimentable, will tend to run down the lower wall of the sloping part. By the time the wort, which has by now fermented, reaches the upper end of the sloping part 24 it carries little or no yeast and is withdrawn in a substantially yeast free state.

Wort, carrying yeast at the average concentration obtaining within the main body of wort in vessel 18, is withdrawn through the secondary effluent pipe 23 and by mixing the primary and secondary effluents the concentration of yeast in the aggregate effluent may be controlled.

Mixing may be carried out in either of two ways, viz. by proportioning the concurrent relative flows through pipes 22 and 23, by adjustment of the cocks 25 and 26, or by providing conventional means for shutting of said cocks alternately with appropriately timed intervals, the aggregate outflow equaling the inflow, so that equilibrium flow obtains through the system.

Thus by first removing only a small amount of yeast the concentration of yeast within the vessel 18 may be built up, and by subsequently withdrawing a greater amount of yeast the concentration of yeast within the vessel 18 can be kept steady at a level of concentration higher than that within the wort entering the vessel. Under normal chemostat conditions the levels of concentration of yeast in the wort entering and leaving the vessel 18 will be similar.

I claim:

1. Apparatus for controlling the degrees of concentration of sedimentable particulate material constituting a suspension in a body of liquid contained in a throughflow vessel, relative to the concentration of said particulate material in the liquid suspension constituting the inflow to said vessel and relative to the concentration of said particulate material in the liquid suspension constituting the effluent from said vessel, including:

a vessel having an entrance for liquid, a primary effluent pipe for liquid and a secondary effluent pipe for liquid;

means for agitating the main body of liquid suspension in said vessel to maintain a substantially constant dispersion of particulate material therein;

means for shielding a region of said liquid suspension in said vessel from the effects of said agitating means comprising said primary effluent pipe, the latter being situated within said shielded region and adapted to withdraw liquid from a level therein near the surface, at a zone where the concentration of particulate material is slight, and said secondary effluent pipe being situated within the unshielded part of said vessel and adapted to withdraw liquid from a zone in said vessel where the concentration of particulate material is the average obtaining in said vessel;

and means for adjusting the relative volumetric flow rates of said primary and secondary effluent pipes.

2. Apparatus as claimed in claim 1, wherein said primary effluent pipe comprises a tube inclined to the vertical and extending downwardly from above the surface of said liquid suspension, to a substantial depth within said vessel, and a communicating tubular portion which leads off from within said shielded region near the surface of said liquid, while said secondary effluent pipe leads off directly from the part of said vessel which contains the main body of said liquid suspension.

3. Apparatus for controlling the degrees of concentration of sedimentable particulate material constituting a suspension in a body of liquid contained in a throughflow vessel, relative to the concentration of said particulate material in the liquid suspension constituting the inflow to said vessel and relative to the concentration of said particulate material in the liquid suspension constituting the effluent from said vessel; including a vessel having an entrance for liquid, a primary effluent pipe for liquid and a secondary effluent pipe for liquid; means for agitating the main body of liquid suspension in said vessel to maintain a substantially constant dispersion of particulate material therein; means for shielding a region of said liquid suspension in said vessel from the effects of said agitating means, comprising said primary effluent pipe, the latter being situated within said shielded region and adapted to withdraw liquid from a level therein near the surface, at a zone where the concentration of particulate material is slight, and said secondary effluent pipe being situated within the unshielded part of said vessel and adapted to withdraw liquid from a zone in said vessel where the concentration of particulate material is the average obtaining in said vessel; and means for effecting adjustably timed intermittent and alternating flow from said primary and secondary effluent pipes.

4. Apparatus for controlling the degrees of concentration of sedimentable particulate material constituting a suspension in a body of liquid contained in a throughflow vessel, relative to the concentration of said particulate material in the liquid suspension constituting the inflow to said vessel and relative to the concentration of said particulate material in the liquid suspension constituting the effluent from said vessel; including a vessel having an entrance for liquid, a primary effluent pipe for liquid and a secondary effluent pipe for liquid; means for agitating the main body of liquid suspension in said vessel to maintain a substantially constant dispersion of particulate material therein; means for shielding a region of said liquid suspension in said vessel from the effects of said agitating means comprising said primary effluent pipe, and including a tube inclined to the vertical and extending downwardly from above the surface of said liquid suspension, to a substantial depth within said vessel, said primary effluent pipe being situated within said shielded region and adapted to withdraw liquid from a level therein near the surface, at a zone where the concentration of particulate material is slight, and said secondary effluent pipe being situated within the unshielded part of said vessel and adapted to withdraw liquid from the main body of said liquid suspension in said vessel where the concentration of particulate material is the average obtaining in said vessel; and means for effecting adjustably timed intermittent and alternating flow from said primary and secondary effluent pipes.

References Cited by the Examiner
UNITED STATES PATENTS 3,078,166   2/1963   Hough et al. _____ 259—8 X WALTER A. SCHEEL, *Primary Examiner.*